(12) United States Patent
Ballard et al.

(10) Patent No.: US 11,766,893 B2
(45) Date of Patent: Sep. 26, 2023

(54) WHEEL COMPONENT IN PARTICULAR FOR BICYCLES

(71) Applicant: DT SWISS INC., Grand Junction, CO (US)

(72) Inventors: Jean-Paul Victor Ballard, Thalwil (CH); Matthew Jayaraman, Zürich (CH); Simon Hugentobler, Liebefeld (CH); Martin Walthert, Aarberg (CH)

(73) Assignee: DT SWISS INC., Grand Junction, CO (US)

( * ) Notice: Subject to any disclaimer, the term of this patent is extended or adjusted under 35 U.S.C. 154(b) by 110 days.

(21) Appl. No.: 17/320,378

(22) Filed: May 14, 2021

(65) Prior Publication Data
US 2021/0354517 A1 Nov. 18, 2021

(30) Foreign Application Priority Data
May 15, 2020 (DE) .......................... 102020113270.0

(51) Int. Cl.
*B60C 3/04* (2006.01)
*B60C 11/03* (2006.01)
(Continued)

(52) U.S. Cl.
CPC .............. *B60C 3/04* (2013.01); *B60C 11/032* (2013.01); *B60C 11/24* (2013.01); *B60C 13/001* (2013.01); *B60C 13/02* (2013.01); *B60C 2200/12* (2013.01)

(58) Field of Classification Search
CPC ..... B60C 11/032; B60C 11/033; B60C 11/24; B60C 2200/12; B60C 13/001; B60C 13/02; B60C 13/023
See application file for complete search history.

(56) References Cited

U.S. PATENT DOCUMENTS 8,888,195 B1 * 11/2014 Hed ...................... B60B 21/104
301/95.104
2002/0157748 A1 10/2002 Weller, Jr.
(Continued)

FOREIGN PATENT DOCUMENTS

CA 2902079 A1 2/2017
CN 202742997 U 2/2013
(Continued)

OTHER PUBLICATIONS

Machine translation EP 2662227.*
(Continued)

*Primary Examiner* — Robert C Dye
*Assistant Examiner* — Wendy L Boss
(74) *Attorney, Agent, or Firm* — Greer, Burns & Crain, Ltd

(57) ABSTRACT

A wheel component for sports and racing bicycles with an annular tire and a central tread surface, which in proper use in straight-ahead travel on a plane ground circumferentially makes contact with the surface of the ground, and which opens up a central longitudinal sectional plane. Planar aero elements are configured on the surface of the annular tire, laterally spaced apart from the longitudinal sectional plane. The aero elements are configured as depressions in the surface of the tire and are disposed on the side surfaces and define angular bands rotating on the side surfaces. The surface proportion of the aero elements to the surface of an angular band is larger than 5% and less than 25%.

21 Claims, 6 Drawing Sheets

(51) Int. Cl.
*B60C 11/24* (2006.01)
*B60C 13/00* (2006.01)
*B60C 13/02* (2006.01)

(56) References Cited

U.S. PATENT DOCUMENTS

| | | | |
|---|---|---|---|
| 2008/0000562 A1* | 1/2008 | Mohr | B60C 11/24 152/209.5 |
| 2009/0078349 A1* | 3/2009 | Nakagawa | B60C 11/0302 152/209.11 |
| 2013/0200683 A1* | 8/2013 | Nicol | B60B 7/0006 301/37.108 |
| 2022/0250414 A1* | 8/2022 | Sahashi | B60C 11/032 |

FOREIGN PATENT DOCUMENTS

| | | |
|---|---|---|
| CN | 103987540 A | 8/2014 |
| EP | 2662227 A1 | 11/2013 |
| EP | 2883716 B1 | 6/2017 |
| JP | 09086106 A * | 3/1997 ........... B60C 13/001 |

OTHER PUBLICATIONS

Machine translation JP 0986106.*
Mavic Yksion Pro UST Review, https://www.bicyclerollingresistance.com/road-bike-reviews/mavic-yksion-pro-ust-2018 (Year: 2018).*
Sigma Sports, Mavic Yksion Pro UST Tubeless Ready Clincher Tyre | Sigma Sports (Year: 2018).*
Performance Bikes, Mavic 2020 Yksion Pro UST II Tubeless Road Tire (Black)—Performance Bicycle (performancebike.com)> (Year: 2020).*
German Search Report received in Application No. 102020113270.0 dated Jul. 7, 2020.
European Search Report received for Application No. 21173986.7, dated Oct. 12, 2021.

* cited by examiner

WHEEL COMPONENT IN PARTICULAR FOR BICYCLES

BACKGROUND

The present invention relates to a wheel component for at least partially muscle-powered vehicles such as bicycles, and in particular sports and racing bicycles, wherein the wheel component comprises an annular tire with a tread surface, which in proper use in straight-ahead travel on a plane ground, makes contact with the surface of the ground.

The prior art has disclosed a great variety of wheel components, with which to achieve improved aerodynamic properties of bicycle wheels. Specifically, for amateurs and in the field of semiprofessional and professional bicycle sports, there is extensive research and energy input to improvement on bicycle components. There are attempts on a regular basis to reduce the weight of bicycle components. At the same time, improvements to stability and increase of efficiency are intended.

Besides weight reduction of the components involved, a significant approach is improved aerodynamics. At high speeds, the aerodynamic resistance to vehicular motion is the most significant resistance. This is why, in recent years, there has been considerable research input so as to provide a more aerodynamic design of the various bicycle components.

The prior art has disclosed bicycle wheels in which specific combinations of rims, spokes, hubs, and tires show improved aerodynamic properties. It has been found that the advantageous properties tend to be obtained only with specific combinations of hubs, tires, spokes, and rims, and that moreover, the desired results are not always obtained even then.

SUMMARY

It is, therefore, the object of the present invention to provide a wheel component with which to achieve, on the whole reliably and reproducibly, improved aerodynamic properties in operation. The improved aerodynamic properties are, in particular, intended to be effective, not only with maximum speeds, but likewise with average and lower speeds. Employing different combinations of tires, rims, etc. should, in particular, be made feasible.

A wheel component, according to the invention is as a rule provided for vehicles, which in proper use are at least partially muscle-powered, such as bicycles and in particular sports and racing bicycles, and comprises an annular tire with a tread surface configured in a central triangle segment and laterally adjacent side surfaces. The tread surface of the annular tire, in proper use in straight-ahead travel on a plane ground, makes at least partial (circumferential) contact with the surface of the ground. The tread surface opens up a central, and in particular on-center or off-center, longitudinal sectional plane of the tire. Aero elements are configured on the surface of the annular tire. The aero elements are configured laterally spaced apart from the longitudinal sectional plane. The aero elements are each configured planar and (at least predominantly or nearly all, or all) are configured as depressions in the surface of the tire and are disposed on the side surfaces. The aero elements define circumferential angular bands on the side surfaces. The surface proportion of the aero elements to the surface of an angular band is more than 5% and less than 25%.

This wheel component according to the invention has many advantages. A considerable advantage is the simple configuration. It has been found that a relatively small number of aero elements for whirling the impinging air can obtain very advantageous, aerodynamic properties. Due to the planar configuration of the aero elements, a very small surface proportion is sufficient for achieving high efficiency even with relatively slow speeds. The high efficiency is also retained in high speeds though.

The configuration, according to the invention, has been optimized in the scope of extensive wind tunnel tests, wherein specifically a small number of large-area aero elements allowed to achieve very good results. This is reflected in the small surface proportion of the aero elements to the angular band. In the prior art, attempts were made to use large numbers of aerodynamically effective elements. This increases the effective surface roughness, and in fact, efficiency was reduced compared to the invention. Specifically, with average speeds of 37.5 km/h, according to the invention a sailing effect can already be utilized in many situations, wherein air impinging obliquely from the front is utilized for generating propulsion.

The invention enables such a sailing effect not only with high (relative) speeds of 45 km/h or more, but also already with average speeds of 37.5 km/h and even with low speeds of 30 km/h. This is difficult to achieve, and none of the competitors' products achieved as much.

The aero elements define circumferential angular bands on the side surfaces, wherein an angular band is configured as a ring, which is defined radially inwardly and radially outwardly by the radial extension of the aero elements.

The angular bands may, in particular, be delimited radially inwardly and radially outwardly by the radially innermost sections of the planar aero elements and by the radially outermost sections of the planar aero elements. Particularly preferably, the aero elements are configured not, or almost not, on the tread surface, so that the tread surface is substantially, or, in particular, completely free of aero elements.

A lateral projection of an angular band forms in particular a circular ring. The angular band per se extends on the curved surface of the tire.

Preferably, the angular band is radially inwardly delimited by a circle on the surface centric to the tire and directly adjacent to the radially innermost point of the aero elements. The angular band is, in particular, radially outwardly delimited by a circle on the surface centric to the tire and directly adjacent to the radially outermost point of the aero elements.

In a preferred configuration, the angular band is radially outwardly delimited on one side of the tire by a concentric, circular line, where at least 95% or 99% of the surface of the aero elements lie radially inwardly on this side of the tire. Then, the angular band is preferably radially inwardly delimited by a concentric, circular line, where at least 95% or 99% of the surface of the aero elements lie radially outwardly on this side of the tire. Then, at least 90% of the surface of the aero elements lie in the angular band on this side of the tire. This applies correspondingly to the other side of the tire on the opposite side of the longitudinal sectional plane.

It may be helpful for the surface of the tire, except for the aero elements, to be largely, or even nearly entirely, smooth. Aero elements are only configured laterally spaced apart from the longitudinal sectional plane. This provides an aerodynamically particularly optimal wheel component.

Preferably, the surface of the tire shows minimal roughness. In particular, is the average roughness Ra on at least 90% of the surface, and in particular at least 95%, and preferably at least 97.5% or 99% or 99.5% of the surface of the tire visible in operation, less than 100 μm and preferably less than 50 μm, and it may be less than 25 μm. In particular, is the averaged profile height Rz (on pertaining surface portions) less than 150 μm and preferably less than 100 μm. A profile height Rt, defined as the difference between the maximum and minimum values of the surface deviation (on pertaining surface portions, and in particular the surface portions indicated above) is, in particular, less than 200 μm and preferably less than 100 μm. The aero elements are not regarded as roughnesses, but they form a structure, wherein preferably every, or nearly every, aero element is per se in turn preferably smooth, comprising a profile height Rt of in particular less than 200 μm and preferably less than 100 μm.

Surprisingly, it has been found that single aero elements, separate from one another, explicitly differentiated, and planar in configuration, on the surface of the tire, and laterally spaced apart from the longitudinal sectional plane, considerably improve the aerodynamics of the tire in a simple and very effective way.

The tread surface is, in particular, configured continuously on the circumference of the wheel component, so that on the circular circumference on the central longitudinal sectional plane, every section of the circumference makes contact with a plane ground. Although it is possible, it is not required and many configurations are not provided, for the entire width of the tread surface to make contact with the ground. It may happen that during operation, all the width areas of the tread surface make contact with the ground in cornering. It may also happen that some of the width areas of the tread surface never make contact with the ground.

In all the configurations, it is particularly preferred for discrete aero elements to be designed. The aero elements are, in particular, separate from one another, and separate from a part or section of an unprofiled and/or nearly entirely smooth tire surface. The separating sections or surfaces are, in particular, (multiple times) larger than the aero elements.

Preferably, each of the aero elements is configured separately, so that the aero elements are neither partially nor on the whole configured as continuous elements. Preferably, each aero element is configured separately on the surface and spatially separated from the next aero element.

Preferably, the distance from an aero element to the next aero element is larger in the peripheral direction than is the length of the aero element in the peripheral direction. Particularly preferably, the distance from an aero element to the next aero element is larger than the maximum dimension of the aero element.

It is also possible for an, or each, aero element, to be formed by two, three or four or more sections, which in their entirety form a discrete, separately configured aero element on the surface of the tire.

Particularly preferably, the surface proportion of the aero elements to the surface visible in proper use, or even the entire surface of the tire, is more than 1 or 2% and preferably less than 6% or 8%. Preferably, the surface proportion of the aero elements to the surface visible in proper use, is between 2.5% and 5%. Preferably, the surface proportion of the aero elements to the entire surface of the tire is between 2% and 5%. Surprisingly, it has been found that this low surface proportion is highly effective and results in very positive aerodynamic properties.

Each aero element comprises, in particular, between 0.01% and 0.1% of the surface visible in proper use, or of the entire surface of the tire. One or each of the (planar) aero elements in particular shows a surface proportion between 0.02% and 0.05% or 0.06% of the surface visible in proper use or the entire surface of the tire.

The surface visible in proper use is understood to mean, in the case of wired-on tires or foldable tires or the like, the outwardly surface of the tire between its tire beads. In a specific example, the outwardly surface of the tire between the tire beads is about 135.000 square millimeters. In proper use this corresponds to the visible surface. Then, an aero element showing 0.04% surface proportion, shows a surface of 54 square millimeters.

Particularly preferably, (all or nearly all of) the aero elements (substantially) show a compact and angular structure. In particular, at least one side wall section of the plurality of the aero elements, or all of the aero elements, are configured steep, and preferably show an angle of larger than 60° and in particular larger than 75° (or 80° or 85°) relative to the circumferential surface.

It is preferred for the aero elements to be approximately rectangular in structure. Preferably, at least two side wall sections of the aero element are configured steep. In particular at least the side wall sections are configured steep in the radial direction. It is possible that all the side wall sections are configured steep.

Preferably, at least one side wall section of the aero element is configured steeper in the radial direction than is a side wall section in the peripheral direction of the raceway. Particularly preferably, two side wall sections of the aero element are configured steeper in the radial direction than is a side wall section in a peripheral direction of the raceway.

Particularly preferably, the side wall sections are configured steeper in the radial direction than in the peripheral direction. In the other of the peripheral directions, one side wall section may likewise be configured steeper.

Preferably, the maximum height difference of an aero element to the surrounding surface is at least twice or three times the maximum height difference within the angular band outside of the aero elements.

Particularly preferably, at least the tread surface and the surface of the angular band, except for the aero elements, are configured without profile and/or flat.

It is preferred for the entire surface of the tire in proper use, except for the aero elements, to be configured largely or even nearly entirely, without profile and/or flat.

In particular, the tread surface and the surface of the angular band and/or the surface of the tire in proper use, are on the whole nearly entirely configured smooth, except for the aero elements. Unevennesses, as they occur in normal manufacturing processes (and preferably also unevennesses showing two- or threefold amplitudes) are, in particular, considered to be still nearly entirely smooth.

In preferred specific embodiments, at least one indicator unit is formed on the circumference of the tread surface to indicate an aerodynamic quality degree or an aerodynamic quality level or an aerodynamic quality rating of the tire. It is also possible for at least one wear detection element to be included on the circumference of the tread surface, to indicate the degree of wear of the tire and its effects on the aerodynamics.

Configurations where an indicator unit is employed for indicating some kind of aerodynamic quality degree or the like, are very advantageous since the user is thus given an unambiguous criterion for exchanging the tire prior to use in important situations. In normal training it is of secondary importance whether the wheel component meets the highest aerodynamic requirements, but in major races, every detail counts.

In all the configurations, it is particularly preferred for the surface of the annular tire to show more than 10 or 20 and less than 400 (or 1000) (discrete and/or separate) aero elements. Particularly preferably, between 40 and 400 aero elements are provided on the surface of the annular tire. Particularly preferably, each of the angular bands shows between 20 and 100 aero elements on the surface of the annular tire.

In particularly preferred specific embodiments, aero elements are configured on both sides of the longitudinal sectional plane. Preferably, exactly one angular band each is provided on each of the two sides of the longitudinal sectional plane. In particular, a number of between 10 and 200 aero elements is formed on each side of the longitudinal sectional plane. Preferably, between 15 and 100 aero elements are formed on each side. In particularly preferred configurations, between 25 and 75 aero elements are provided on at least one side, and, in particular, on each of the two sides.

In a specific and very advantageous configuration, 48 (50+/−5) aero elements are formed on each side. This has achieved very good results, better than with considerably larger numbers.

Particularly preferably, two axially adjacent aero elements on the two sides of the longitudinal sectional plane are offset to one another in the peripheral direction.

Particularly preferably, the aero elements are distributed symmetrically over the pertaining circumference at least on one side, and, in particular, on both sides. The aero elements are, in particular, aligned offset relative to one another on the pertaining sides, wherein the aero elements on one side are angularly disposed exactly between the aero elements on the other side.

Particularly preferably, at least one aero element shows a radial extension between 0.25 mm and 2 mm. Particularly preferably, an aero element shows a radial extension between 0.35 mm and 1.5 mm or 2 mm, and in preferred specific embodiments, between 0.4 mm and 1.5 mm or 2 mm, and, in particular between, 0.5 mm and 1.2 mm.

In a concrete configuration, the radial extension is approximately 0.75 mm (+/−0.05 mm). A radial extension of 0.75 mm and, in particular, 1 mm has been found very positive. A radial extension is understood to mean the difference between the height or depth relative to the surrounding surface of the aero element.

It is particularly preferred for the aero elements to be configured as depressions on the surface of the tire. Alternately it is possible for the aero elements to project outwardly from the surface of the tire and thus to be configured as elevations. It is a considerable advantage of depressions that the cross section of the impingement area and thus the aerodynamic drag is lower than with the aero elements configured as elevations. Alternately, a combination is conceivable where single aero elements are configured as depressions and single aero elements, as elevations. Particularly preferably, all the aero elements are configured as depressions.

In preferred specific embodiments, at least one aero element has a length on the surface transverse to the circumference of the tread surface between 2 mm and 16 mm. The length on the surface is, in particular, understood to mean the length along the surface and along the crown, i.e., the arc length. The length on the surface transverse to the circumference of the tread surface is in particular understood to mean the length in the axial direction along the surface of the crown, i.e., the arc length of the tire.

Particularly preferably, at least one aero element, and, in particular, nearly all the aero elements, or all the aero elements, show a length on the surface transverse to the periphery of the raceway between 3 mm and 15 mm, and in particular between 4 mm and 12 mm, and particularly preferably between 6 mm and 10 mm. The length on the surface transverse to the circumference of the tread surface is, in particular, between 7 and 9 mm, and in a specific configuration, it is (approximately) 8 mm.

Preferably, at least one aero element, and, in particular, nearly all the aero elements, or all the aero elements, show a length on the surface in the peripheral direction between 3 mm and 20 mm, and preferably between 4 mm and 15 mm, and in particular between 3 mm and 15 mm, and particularly preferably between 6 mm and 10 mm or between 4 mm and 9 mm. In a specific configuration, the length of an aero element on the surface is approximately 6-7 mm in the peripheral direction. In the sense of the present application, the term "nearly all" is understood to mean at least 90% or 95%.

The bottom of the aero elements is configured, in particular, two-dimensional and (largely) planar.

Preferably, at least one aero element, or a plurality of the aero elements, or nearly all, or all of the aero elements, show a radially outwardly surface on the tire between 10 mm$^2$ and 200 mm$^2$ (square millimeters). Preferably, the radially outwardly surface of the aero elements is between 15 mm$^2$ and 100 mm$^2$ each, and particularly preferably, between 20 mm$^2$ and 70 mm$^2$. In a specific case, the outwardly surface of an aero element or the aero elements is between 40 mm$^2$ and 60 mm$^2$ each, approximately 48 mm$^2$ or 56 mm$^2$. A radial extension of 8 mm and an extension in the peripheral direction of 6 mm to 7 mm has been found to be very positive.

In all the configurations it is preferred for at least one aero element to show a pouch-like, pot-like or basin-like structure. This e.g. pot-like structure may show steep walls to all the edges, having angles of 70° or 80° or more, or 90°. It is possible and preferred for all the walls to show a gradient of more than 70° or more than 80° or more than 85°.

It is possible and preferred for at least one aero element and in particular e.g. one third, one half, or all of the aero elements, to form a largely homogeneous depression with steep walls. Then the bottom area of the aero element preferably has a surface between 20 mm$^2$ and 81 mm$^2$.

Particularly preferably, at least one aero element and in particular e.g. one third, one half, or all of the aero elements show a basin-like structure, where single walls are very steep, and at least one of the walls is flatter. For example, the radially inwardly and radially outwardly walls may be steeper, while exactly one, or at least one wall extending in the peripheral direction is flatter. It is preferred for one wall extending in the peripheral direction to be steep, showing an angle of more than 70° or 80° or more than 85° to the surface. Preferably, the flatter wall is oriented forwardly when the aero element is on the top end of the tire, far removed from the ground.

It has been found that a pot-like and/or basin-like structure and single, discrete aero elements achieves considerable improvements to the aerodynamic properties of the tire and the wheel component.

In a concrete preferred configuration, (at least substantially all, or nearly all, or) all of the aero elements are configured basin-shaped, showing a largely plane bottom area, followed by an adjacent, flatter flank ascending in the peripheral direction of the wheel component. Particularly preferably, the aero element is (approximately) square-shaped and the bottom area shows a depth of more than 0.3 mm across a surface of between 15 mm$^2$ and 40 mm$^2$. Preferably, the depth is more than 0.6 mm across more than 7 mm or 90% of the radial height, and across the length in the peripheral direction, of more than 2 mm.

In all the configurations, at least one aero element, or at least substantially all, or nearly all, or all the aero elements preferably show a compact structure, in which the ratio of the maximum extension to the minimum extension on the surface of the tire is less than 6 and, in particular, less than 5. Preferably, the ratio of the maximum extension to the minimum extension on the surface of the tire is (more than 1 and) less than 4 or 3. Particularly preferably, the ratio is less than 2. The larger extension preferably extends transverse to the peripheral direction of the wheel component and particularly preferably, nearly radial or radial.

Preferably, the ratio of the maximum length of an aero element in the peripheral direction of the wheel component to the maximum length in the transverse direction (e.g. radially) thereto is between 1/3 and 3/1, and in particular between 1/2 and 2/1, and particularly preferably between 3/5 and 5/3. These ratios of the maximum extension and the maximum length define very compact structures of aero elements, which are configured discrete and separate from one another on the surface of the tire.

In advantageous specific embodiments, at least one aero element shows an angular structure, wherein at least 2 or 3 side walls show an angle to the surface of more than 60° and, in particular, more than 70°, 75° or more than 80°. Particularly preferably, at least one aero element shows an inclined side wall extending in the peripheral direction, which substantially shows an angle of less than 50° or 45°, or less than 40° or 30° to the surface. In preferred configurations, three steep(er) walls and a flat(ter) wall are provided, which, in particular, form on the whole an approximately basin-like structure of the aero element.

Particularly preferably, on the surface visible in proper use, the tire does not show, except for the aero elements and indicator units if any, elevations or depressions whose radial extension is larger than a type code given on the surface. A type code on the surface is often required by law, wherein the type code characters are radially outwardly set off from the surrounding surface. It is possible for the entire surface or parts of the surface to show slight fluctuations or slight depressions and elevations ensuing from the manufacturing process, which may even be intentional to increase the handling feel but whose radial extension is lower than is the type code on the surface. A type code in particular also comprises the recommended or provided maximum air pressure. The type code corresponds to the applicable legal requirements, which may differ between countries. The characters are in particular at least or precisely 3.2 mm in height.

Preferably, on the surface visible in proper use, except for the aero elements and indicator units if any and a type code if any, the tire is (substantially) non-profiled or without profile, and preferably at least substantially or entirely, configured smooth. A non-profiled surface is, in particular, a surface showing unintentional, neither controlled nor intentionally planned, surface structures with a maximum radial extension of more than 0.25 mm. Preferably, a surface without profile or a non-profiled surface is understood to mean a smooth surface. However, in the manufacturing process it may e.g. happen or be intended that minor depressions and elevations occur on a regular or irregular basis.

Preferably, the maximum height difference on the surface visible in proper use, except for the aero elements, of the at least one indicator unit and a type code if any, is less than 0.35 mm or less than 0.2 mm. One aspect is that due to the aero elements, intended turbulences are set off on the surface, while the surface per se is configured as smooth as possible, generating little friction.

In particular, at least one type code is comprised, which is formed by way of local elevations. Preferably, the characters of the type code project outwardly at least or precisely 3.2 mm beyond the surrounding surface. A type code is in particular formed on the side surface outside the angular bands.

In all the configurations it is preferred for the tire to be a clincher or a wired-on tire or foldable tire. Preferably, the tire shows circumferential tire beads. Reinforcing rings and/or reinforcing ring sections and/or wire rings may be comprised in the tire beads or in the tire. It is also possible and particularly preferred for the tire to be a tubeless tire and to be employed without using a tube. These tires are also referred to as tubeless tires. It is also conceivable to glue the tire onto a rim. Then, rims without rim flanges may be used. These tires may also be referred to as tubular tires or tube type tires.

In all the configurations it is possible and preferred for the tire in proper use to show a maximum width of less than 36 mm or less than 34 mm and, in particular, less than 30 mm. The maximum width of the tire in proper use may, in particular, be less than 32 mm, 28 mm or 25 mm. In a concrete case, the width of the tire is between about 25 and 29 mm and may be e.g. 27.2 mm. Preferably, the tire is provided and configured for an operating pressure between 4 and 12 bar, and in particular between 6 and 10 bar, and particularly preferably for an operating pressure of approximately 8 bar. Use is also possible in so-called gravel bikes, where the width of the tire may be larger.

In all the configurations it is preferred for the central tread surface to extend over a triangle segment of more than 18°, or, in particular, more than 20° and less than 80°, and preferably less than 70°, transverse to the peripheral direction of the wheel component. Particularly preferably, the central tread surface is symmetrical to the longitudinal sectional plane, so that it extends on each side over an area, in particular, between 9° or 10° and 35°. Preferably, the central tread surface extends on the whole over a triangle segment more than 25° and less than 70°, and in particular over a triangle segment more than 35° and less than 65°. In particularly preferred configurations, the central tread surface extends over a triangle segment of between 35° and 55° or 60°, and it may specifically be ca. 22° or 52°.

Particularly preferably, the aero elements extend on each side in an angular band of less than 45° or less than 40° width. The angular band of the aero elements is preferably directly or nearly directly adjacent to the triangle segment of the central tread surface. The two angular bands on the pertaining sides extend, in particular, over an angular range between 20° and 40°, and preferably over angular bands having an angle width between 25° and 35° each.

In all the configurations it is particularly preferred for the aero elements to cover more than 5% of the surface of the angular band and less than 25% of the surface of the angular band. Particularly preferably, the aero elements cover between 10% and 20% of the surface of the angular band. In a concrete configuration the proportion of the aero elements to the surface of the angular band is 17.5%+/−2.5%.

If a part of the aero elements and e.g. half of the aero elements provided on each side, is disposed radially somewhat farther outwardly, and the other half of the aero elements provided is disposed radially somewhat farther inwardly, then the entire angular band gets larger. The relative surface proportion of the aero elements to the surface of the angular band is thus reduced, although the entire surface of all the aero elements remains unchanged. Then the surface proportion is rather in a lower range, and it may be 7.5% or 10%+/−2.5%.

Particularly preferably, the elements at least on one side are symmetrically distributed over the circumference. Particularly preferably, the aero elements are configured identical at least partially and preferably in groups, and, in particular, nearly all of them, and particularly preferably all of them, are identical in configuration. "Identical" is understood to mean a degree of conformity as it results from manufacture as a rule.

Particularly preferably, the tire (or the radially outwardly half of the tire) is configured substantially oval. In the outwardly area the tire is, in particular, approximately elliptical in shape with a radial semiaxis that is larger than the axial semiaxis.

In all the configurations it is preferred for the shape of the radially outwardly half of the tire to be approximately elliptical, and to remain inwardly of the elliptical shape in proper use at least in an angular range. In particular, the outwardly surface of the tire in proper use remains radially inwardly of the elliptical shape, at least in one of the angles of 45° and 60°, seen from the apex. Particularly preferably, the outwardly surface of the tire in the angular range of 45° to 60°, measured from the apex, remains radially inwardly of the elliptical shape. This results in a somewhat slimmer shape than is provided by an elliptical shape, showing measurably improved aerodynamics.

On the whole, the tire preferably shows an approximately U-shaped cross section, wherein the ends of the legs of the U are followed by the bead regions. The entire cross section of the tire can be referred to as omega-shaped.

Preferably, the elliptical shape adapted to the tire has a radial semiaxis larger than the axial semiaxis. The ratio of the radial semiaxis to the axial semiaxis is preferably larger than 1 and smaller than 1.25, and it is, in particular, between 1.1 and 1.2. The ratio is, in particular, 1.13+/−5%, when the tire and the wheel component are in proper use, for example at an operating pressure of preferably 8 bar.

In all the configurations it is preferred for at least one indicator unit to comprise at least one indicator element and to be suitable to indicate different wear stages. It is possible that as a predetermined wear stage is reached, the aerodynamic properties have dropped beneath a predetermined degree, when used in a front wheel. As a predetermined further stage is reached, the aerodynamic properties of the tire and the wheel component on the whole have preferably dropped beneath a predetermined degree, when used in a rear wheel. In simple configurations the indicator elements respectively the indicator unit are/is configured as a depression on the outwardly peripheral surface of the tire. The indicator unit is, in particular, configured (in a central region) on the tread surface, and the tread surface is subjected to the heaviest wear in normal operation. This means that an indicator unit with indicator elements at different depths is suitable to indicate wear. When the wear is advanced far enough so that an indicator element disappears, the pertaining wear stage is indicated.

In all the configurations it is preferred for the wheel component to comprise a rim on which the tire can be mounted. Preferably, the rim has a maximum width of more than 2/3, and, in particular, more than 3/4 or 7/8 of the maximum width of the tire. The rim in particular shows a maximum width of less than 4/3 or 5/4 of the width of the tire.

Particularly preferably, the rim is widest in a radially central region of the rim body and, in particular, in a region between 40% and 65% (and in particular between 50% and 65%) of the radial height of the rim body. In a concrete configuration, the maximum rim width is larger than the maximum tire width and is preferably 10% (in particular +/−5%) wider than the maximum tire width. This applies, in particular, in an operational state with an inflation pressure in the tire of preferably at least 5 bar or 8 bar.

In advantageous configurations the rim is configured as a hollow rim, comprising an (approximately) V- or U-shaped rim base and consisting at least partially of a light metal alloy and/or at least one fibrous composite material. Such a rim enables an aerodynamic and lightweight configuration, which is suitable for use in sports and in the field of professional cycling.

Particularly preferably, the rim has a substantially smooth surface. The surface of the rim has, in particular, no whirling elements.

In preferred specific embodiments, the wheel component comprises spokes and a hub.

Preferably, at least one indicator unit is comprised on the tread surface on the circumference of the tire of the wheel component. The indicator units indicate, in particular, the degree of the aerodynamic quality of the tire.

An indicator unit for aerodynamic quality indication is very advantageous since it indicates, simply and reliably, the quality degree of the aerodynamics of the employed tire of the wheel component. The rider can see quickly and at a glance whether the installed tires on the front or rear wheels meet the currently required quality grades in terms of aerodynamics.

Preferably, the indicator units are configured multistage, and as a specific wear stage is reached, they show that using the tire on the front wheel is no longer recommended in aerodynamic terms but it is, or may be, still recommended on the rear wheel. Accordingly, as a higher wear stage is reached, it may be indicated that using the tire on the rear wheel is no longer recommended in aerodynamic terms. As another, predefined wear stage is reached, it may e.g. be indicated that using the tire is no longer recommended for reasons of security.

Specific embodiments may provide for an advantageous way of indicating the aerodynamic quality level of a tire of a wheel component of an at least partially muscle-powered vehicle and in particular a bicycle such as a racing bicycle, mountain bike, E-bike or the like. The degree of the aerodynamic quality level of the tire may be read off the tire. Reference is made to the fact that the wheel component may be employed for example in racing bicycles, mountain bikes, E-bikes or the like.

On the whole, the invention shows considerable advantages, and, independently of the combination of rim and tire, it allows a considerable increase of the aerodynamic quality, so that in many situations the rider needs to apply reduced power and thus reduced energy. An optional indicator unit allows in a simple and reliable way, an indication of the time at which the aerodynamic performance decreases. The aerodynamic quality may also be referred to as aerodynamic performance. Then, a further indication is possible if the tire has reached a critical wall thickness and should be replaced for reasons of security.

In wind tunnel tests it has been found that a tire subjected to heavy wear shows earlier flow separation, thus losing aerodynamic performance. It has also been found that, in particular, the sailing effect intended in a bicycle wheel is dependent on the tire and in particular on the state of the tire.

According to the invention, aero elements are provided which are configured discretely and separately on the surface of the tire, and which preferably show a defined depth of preferably more than 0.5 mm. This enables a sailing effect which also becomes obvious in wind tunnel measurements. The indicator unit may for example show the time at which the aerodynamic performance of the wheel component has decreased for example XX %, for example as the second stage is reached.

On the whole, a (nearly elliptical) tire shape has an advantageous effect on the air drag, wherein the aero elements achieve an ideal turbulence level (whirling).

In simple configurations, the aero elements may be configured as angular and e.g. polygonal or rectangular recesses, forming perpendicular, or nearly perpendicular, recesses with a predefined depth.

Surprisingly, it has been found that this achieves a sailing effect nearly independently of the speed, and a comparatively low sensitivity to sidewinds. In particular, the sailing effect is clearly distinct already in relatively low speeds of 30 km/h and it can be experimentally measured and indicated.

In the scope of the invention, it has been found that competing products tend to show high dependence of the aerodynamic properties on the combination of tire and rim and the relative speed. The invention has shown, however, that wheel components combined from different rims and tires achieve advantageous effects in a great variety of relative speeds.

It has also been found that the wheel component according to the invention results in a comparatively lower steering torque. On the whole, it can be shown by wind tunnel data that the wheel component reduces both the aerodynamic drag force and also the steering torque resulting therefrom.

Achieving a sailing effect is advantageous already in lower speeds for example of 30 km/h, wherein it has been found that the distribution of the lateral forces by the tire is also positively influenced, as the reduction of the steering torque shows. Achieving a sailing effect already in lower speeds for example of 30 km/h is very advantageous, since many cycling trips do not always allow riding at maximum speed. Advantageous effects already at 30 km/h or 35 km/h assist the rider better on the whole.

In extensive wind tunnel tests, it has been examined how to achieve a transition from laminar to turbulent flow ideal for a bicycle tire. The flow curve makes a transition from the laminar flow in the laminar region in the transition region, and finally to a turbulent flow as it is present in the turbulence region. It has been found that the ideal transition from laminar to turbulent flow can markedly improve the internal dynamics and the sailing effect of wheels and wheel components. The tire employed can develop very advantageous effects, independently of the rim employed.

On the whole, it has been found that the ideal transition or the transition from laminar to turbulent flow is achieved by employing a comparatively small number of aero elements, wherein the aero elements can in particular show an edge and/or a pocket, preferably approximately rectangular, extending radially to the wheel center.

The aero element or the pocket of the aero element preferably has a depth of at least 0.5 mm and, in particular, approximately 1 mm. The edge or the radial length of the aero element ideally shows a length of approximately 8 mm, and the aero element or the pocket preferably shows a width (in the peripheral direction) ideally of approximately 6 or 7 mm. In particularly preferred configurations, 48 aero elements or pockets are disposed on each of the tire sides, wherein the pockets on the two sides are disposed alternatingly distributed over the circumference.

As regards the theoretical background, given an ideal turbulence level, the tire causes the wheel component and thus a combination of rim and tire, to show aerodynamic advantages over other combinations of rim and tire. It is only the combination of an aerodynamic tire and an aerodynamic rim that offers maximum utilization of the sailing effects with bicycle wheels. It has been found that the tire shows good results with different rims.

Basically, different air flows pass in different paths over one and the same body. The flows differ in their directions and speeds. In the case of a wheel or a wheel component, the flow is predominantly turbulent.

Behind the impinged profile of the wheel component respectively the rim profile, a low pressure area forms which increases the air drag. It is thus the object of the present wheel component to maintain this pressure area low and, in particular, the lowest possible, to thus reduce the aerodynamic drag and so to speak to increase the uplift or the sailing effect.

The air drag is dependent on the size of the impinged surface, and on the size and orientation of the low-pressure area forming behind the rim or wheel component, which again increases the drag. The more aerodynamical the wheel component and the rim are, the smaller is the impinged surface and the low-pressure area. Moreover, an aerodynamic wheel component aligns the low-pressure area so that the aerodynamic drag is reduced, and thus the sailing effect is generated. Thus, the wheel component increasingly generates "uplift".

To keep the air drag of a wheel component down, the air flowing across the wheel must flow along the top rim surface as long as possible. Moreover, the rim shape aligns this suction area. This reduces the drag by way of a low-pressure area.

It has been found to be positive for the tire and the rim to show about the same widths. Then the air can flow better from the tire to the rim without detaching from the wheel.

It has furthermore been found that it is an important object of the tire of the wheel component to whirl the air flowing along. Turbulent flow adheres better to the tire and the rim of the wheel component than does an even, laminar flow.

It has also been found to be very advantageous for the air flow to be whirled on the surface of the tire. Then, whirling the air or whirling the air flow once again, and stronger, on the rim surface is no longer required but it may be counterproductive.

A substantial aspect of the invention is that the tire of the wheel component converts the air flows to a defined turbulent state without generating too much turbulence. Thus, the air does not adhere to the tire but it detaches early.

It may be advantageous for the tire of the wheel component and/or the tread surface to be slightly profiled. Then, the ground adhesion on a wet ground improves as well.

On the whole, the invention utilizes the so-called COANDA effects. The COANDA effect is a cause for the generation of the low-pressure area behind the rim profile of the wheel component. It describes the phenomenon of liquids and gases flowing along a surface. The air, which is thus drawn toward the rim surface, causes the formation of a low-pressure area on the lee side.

In preferred configurations the wheel component is configured as a tire and does not include any other parts.

BRIEF DESCRIPTION OF THE DRAWINGS

Further advantages and features of the invention can be taken from the exemplary embodiments which will be discussed below with reference to the enclosed figures.

The figures show in.

DETAILED DESCRIPTION

Figure 1:
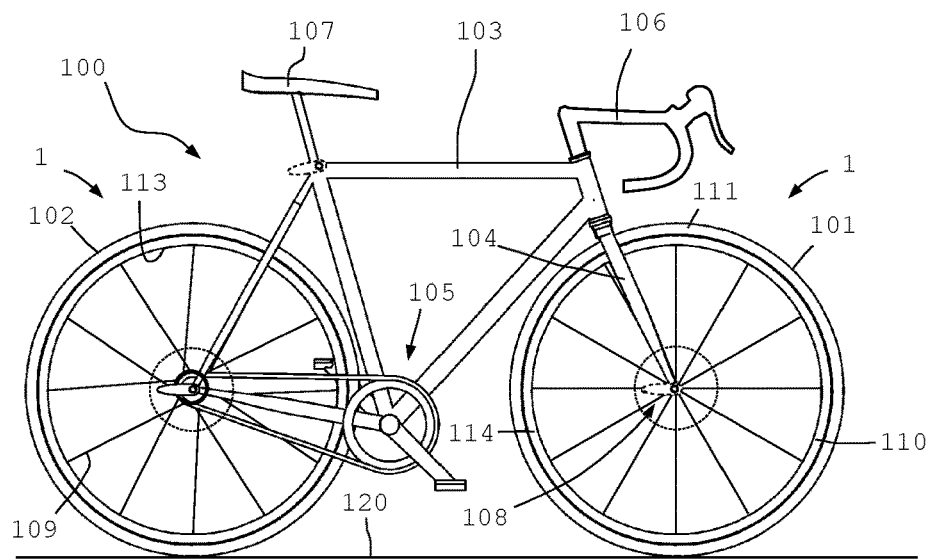
FIG. 1 a simplistic side view of a racing bicycle with wheel components according to the invention.

FIG. 1 illustrates a racing bicycle as the bicycle 100 in a simplistic side view on a flat ground 120. The racing bicycle 100 is provided with a front wheel 101 and a rear wheel 102, each comprising, or configured as, a wheel component 1 according to the invention.

The bicycle 100 is furthermore provided with a frame 103, a fork 104, a pedal crank unit 105, a handlebar 106, a saddle 107, hubs 108, spokes 109, and rims 110, where the tires 2 are accommodated. In the side view one can identify the lateral rim flanks 111 with the structures 114, configured flat and smooth, and the rim base 113.

The racing bicycle 100 is provided for the athletic, semiprofessional, and professional fields of cycling sports, and is, in particular, also suitable for participation in, and carrying out, international competitions. Of particular importance is the aerodynamics of the components and specifically the wheels 101 and 102, provided with, or configured as, wheel components 1. A considerable role in aerodynamic drag is, in particular, played by the cross-sectional area of the wheel component 1 and the aerodynamic properties of the wheel component 1.

Figure 2A:
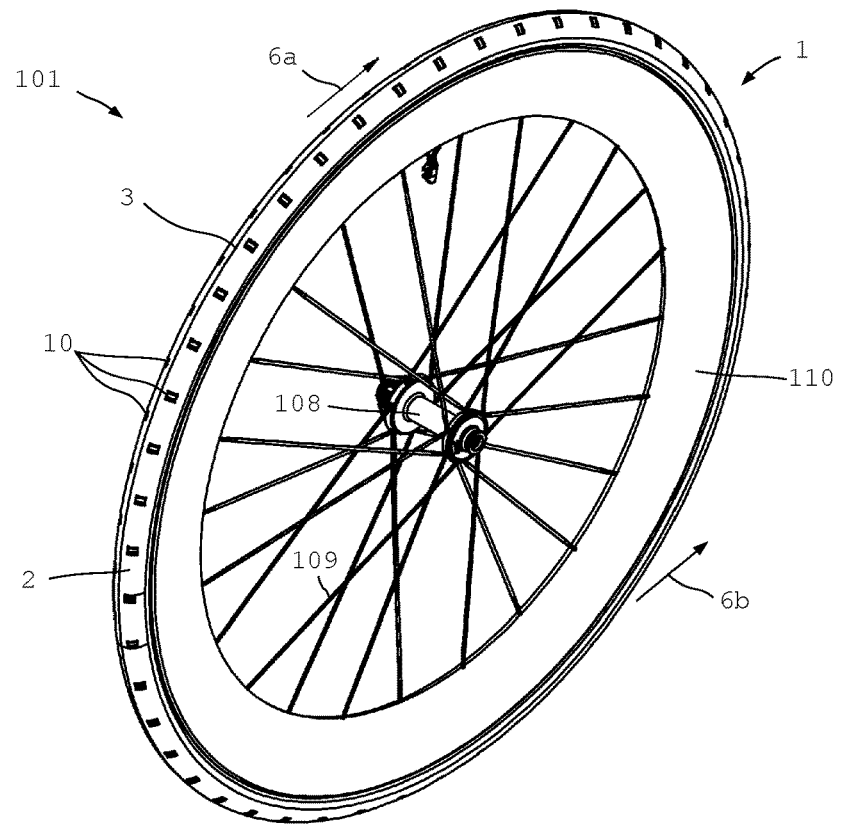
FIG. 2a a perspective view of a wheel component according to the invention.

FIG. 2a shows a perspective view of a wheel component 1, which may comprise an entire wheel 101 including a rim 110, hub 108, spokes 109 and a tire 2. The wheel component 1 may also comprise, or consist of, only the rim 110 and the tire, or only the tire 2. While FIG. 1 shows a schematic illustration, FIG. 2a depicts a more realistic illustration of the wheel component 1.

The wheel 101 moves in the forward direction 6b, while the wheel 101 is rotating in the direction of rotation 6a. The wheel 101 is configured aerodynamical overall. On the surface of the tire 2, single, separate, and planar aero elements 10 are configured, which enable aerodynamically optimal properties of the wheel 101.

Figure 2B:
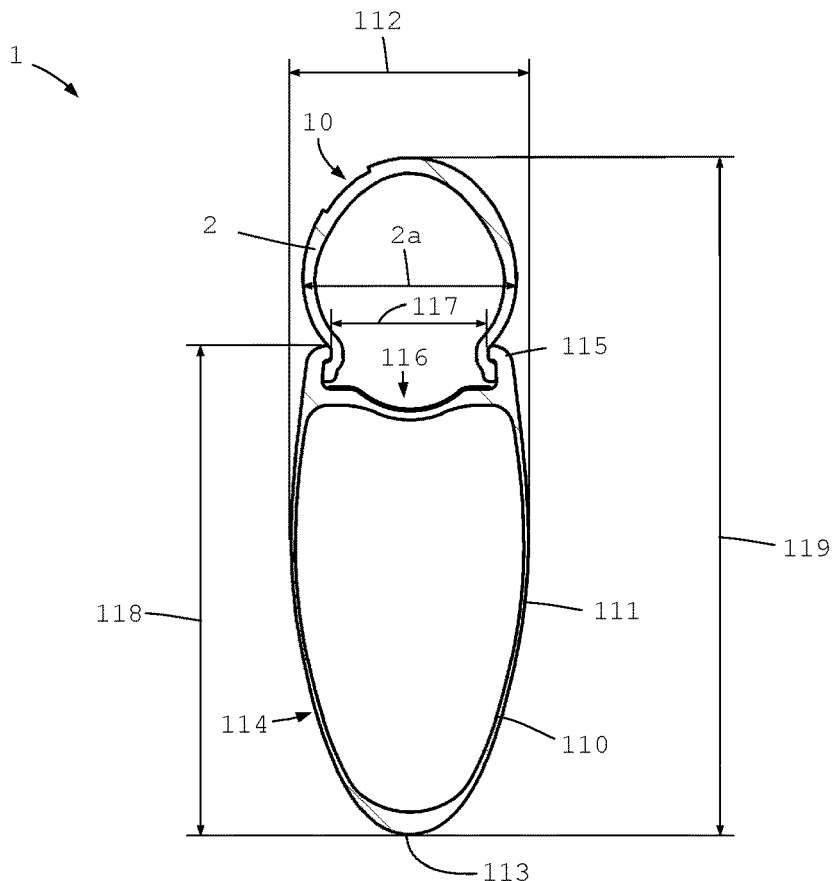
FIG. 2b a cross section of a rim and a tire of a wheel according to FIG. 1.

FIG. 2b shows the cross section of a rim 110 with a tire 2, which can be employed on the wheels 101 and 102 of the racing bicycle 100. FIG. 2b shows a conceivable cross section of FIG. 2a. FIG. 2a may also schematically show a wheel with a tubular tire glued onto the rim.

In FIG. 2b, the rim 110 is configured as a hollow rim and shows lateral rim flanks 111, a rim well 116, a rim base 113, and rim flanges 115, presently accommodating a bead tire as the tire 2. The tire 2 is configured as a wired-on tire or foldable tire, or, in particular, also a tubeless tire 2, and here it is provided for operation without a tube. The circumferential tire beads 2b of the tire bear against the rim flanges 115 of the rim 110.

The side flanks 111, unlike the illustration, may be configured with brake flanks in the top region. Alternately it is possible and preferred for the racing bicycle 100 to be provided with brake disks, and brake flanks are not required.

Between the rim flanges the rim width 117 is evident. The width 2c (cf. FIG. 6) of the tire 2 is suitable for this rim width. The largest total width 112 of the rim 110 is located in the region of the hollow space in a radially central area of the rim body, between the rim base 113 and the rim flanges 115 or the rim well 116. The largest total width 112 of the rim 110 is located at ca. 60% (+/−5%) of the rim height 118, and preferably at 40% (+/−5%) of the radial height 119 of the rim and the tire.

The tires shown are configured as clinchers respectively wired-on tires or foldable tires. In all the configurations the tires may alternately be configured as tubeless tires respectively tubeless outer covers. The tires may likewise be configured as tubular tires or tube type tires. To this end, an accordingly adapted rim is employed.

Figures 3, 4:
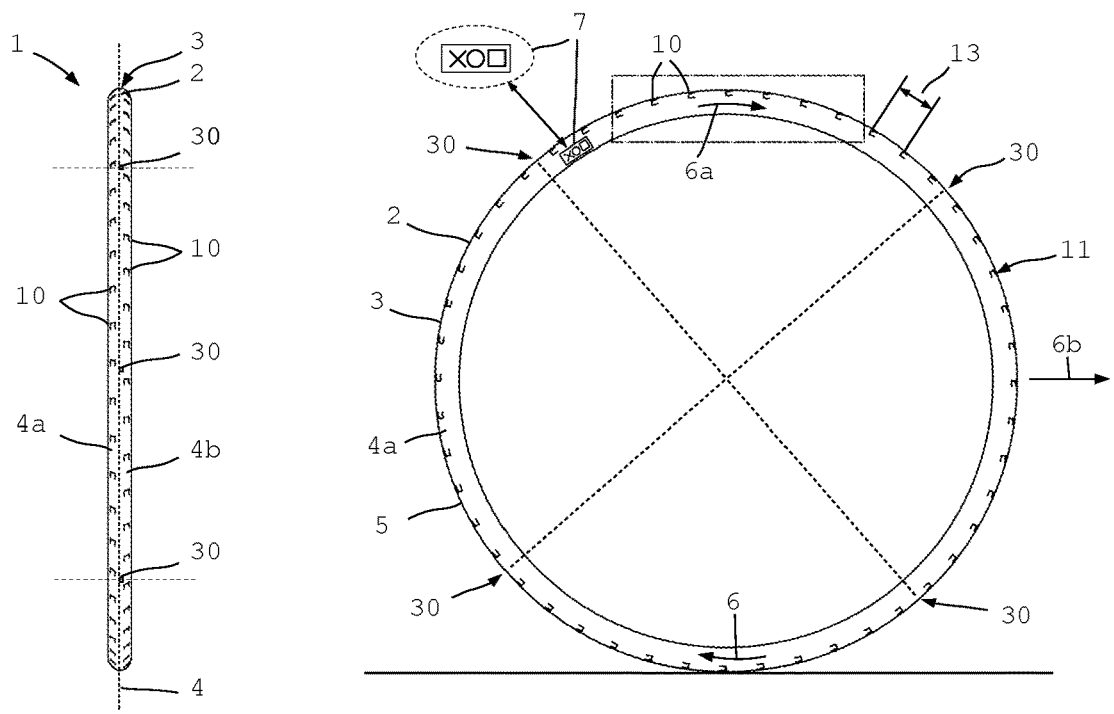
FIG. 3 a simplistic front view of a tire of a wheel component according to the invention.
FIG. 4 a side view of the tire according to FIG. 3.

FIG. 3 shows a schematic front view and FIG. 4, a schematic side view of a tire 2 of the wheel component 1. It is possible to offer and sell only a tire 2 as a wheel component 1. Alternately it is possible for a wheel component to comprise, besides the tire, a rim 110 as well, wherein the tire 2 may subsequently be purchased separately as a wearing part.

The tire 2 of the wheel component 1 shows a central tread surface 3 on the circumference of the tire 2. The tread surface 3 extends in a central section defining a longitudinal sectional plane 4 of the tire 2. Aero elements 10 are provided on both sides 4a, 4b of the longitudinal sectional plane 4, spaced apart from the longitudinal sectional plane 4 and thus laterally offset, each configured separately and singly. Each aero element 10 is configured as a depression in the surface 5 of the tire 2. The aero elements define aero bands 10a, 10b between their radially outwardly and radially inwardly ends (cf. FIG. 7).

Additionally, an indicator unit 30 or a number of indicator units 30 is/are provided distributed over the circumference of the tire 2. The indicator units 30 are each configured inside of the central tread surface 3 of the tire 2.

The single aero elements 10 are disposed on each side 4a, 4b symmetrically distributed over the circumference. However, the aero elements 10 are disposed on the two sides 4a and 4b offset to one another in the peripheral direction, so that the aero elements 10 alternate on the one side 4a and on the other side 4b in the peripheral direction.

As is simplistically shown in FIG. 4, one side 4a or 4b, or both sides 4a, 4b, may be provided with at least one type code 7, comprising characters and/or letters and/or numbers or other symbols, informing the user about the tire type and optionally its dimensions. The symbols shown are illustrated exemplarily only; they are designed and configured according to the applicable national or international rules and laws.

In the side view according to FIG. 4 one can see that a total of four indicator units 30 are provided over the circumference, disposed offset in the peripheral direction at angles of 90° to one another. Alternately it is possible to dispose over the circumference, only one indicator unit 30, or two, three or still more indicator units 30. Preferably, each of the indicator units shows a number of indicator elements or indicator levels or the like, so that, at a glance on an indicator unit, the user is given the degree of the aerodynamic quality respectively the state of the tire in aerodynamic terms. Additionally, it is preferred for at least one indicator level or at least one measure of the indicator unit to indicate when a tire is due to be exchanged, also for reasons of security.

The single aero elements 10 are configured as depressions 11 and are disposed offset at regular intervals 13 in the peripheral direction 6. Here, 48 aero elements each are provided distributed over the circumference of the tire on each of the sides 4a, 4b. It is possible to have more or fewer indicator elements configured on one or both of the sides 4a, 4b. It has been found though that too many aero elements may cause too much turbulence which increases drag, and that too few aero elements generate too little turbulence. Specifically in slow and average speeds.

In FIG. 4, it can be seen that the surface proportion of the aero elements 10 to the outer visible surface of the tire is overall small. Here, the surface proportion is between approximately 3% and 7% and is preferably approximately 5%.

Figure 5:
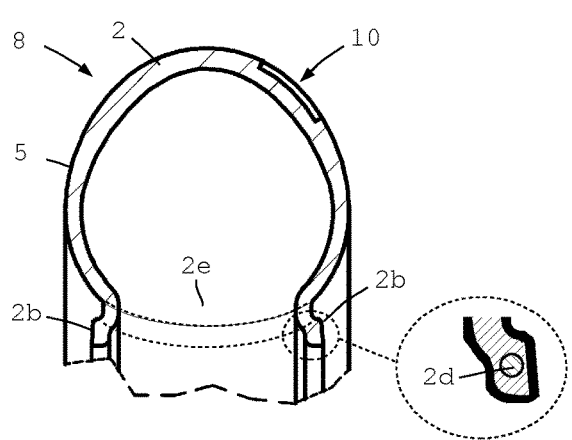
FIG. 5 a cross section of the tire according to FIG. 3.
Figure 6:
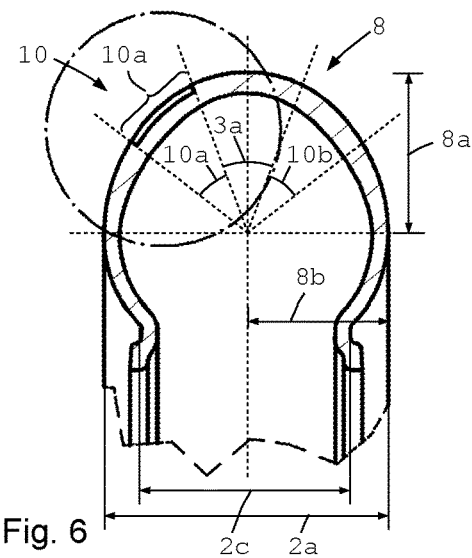
FIG. 6 a different cross section of the tire according to FIG. 3.

FIGS. 5 and 6 show two different radial sections of the tire 2, wherein FIG. 5 shows a section of an aero element 10 on the side 4b and FIG. 6, a section of an aero element 10 on the other side 4a. In all the exemplary embodiments the tire 2 is preferably symmetrical relative to the longitudinal sectional plane 4, which preferably extends centrally through the tire 2.

As can be seen in the FIGS. 5 and 6, the tire 2 shows an approximately U-shaped or omega-shaped cross section, wherein the radially outer part shows an approximately elliptical shape 8, and wherein the tire beads 2b can be seen radially inwardly. The enlarged detail next to FIG. 5 illustrates reinforcement rings 2d, which may be included. It is also possible for the tire 2 to be configured as a tubular tire 2e and to be directly glued onto the rim 110. Then the tubular tire 2e also directly forms the tube, showing a closed circumference in cross section. The radially inwardly wall is shown in broken lines in FIG. 5. In this configuration, the tire beads 2b are omitted.

As can be taken from the illustrations according to FIG. 5 and FIG. 6, the surface 5 of the tire 2, which is visible in operation, is largely and, in particular, nearly entirely configured smooth, except for the single, separate aero elements 10 and the indicator units 30.

The aero elements 10 on the two sides 4a, 4b are each configured in an angular band 10a, 10b, extending across an angle between 25° and 40°, and preferably between 25° and 35°, and presently approximately 32.6°. The angular bands 10a, 10b extend on both sides directly adjacent to the (central) tread surface 3, which presently extends across a triangle segment 3a of preferably between 20° and 60° and presently, approximately 52°. This means that the two angular bands 10a, 10b each begin at an angle of approximately 26° from the central longitudinal sectional plane 4, extending up to close to an angle of 60°. These values describe an actual example, and may deviate in this and in similar variants e.g. +/−2° or +/−3° or +/−5° each, in particular without being limited thereto.

In another concrete example, the tread surface 3 extends across a triangle segment 3a of 22° (+/−5°). The tread surface is symmetrical in configuration and extends across an angle of approximately 11° (+/−2°) each, on both sides of the longitudinal sectional plane 4. The angular bands 10a, 10b directly follow on both sides, adjacent to the tread surface 3. Each of the angular bands 10a, 10b extends across an angle of between 25° and 35° and presently, approximately 30.9°.

In proper use, the substantial cross section of the tire is approximately elliptical in shape 8, wherein the radial semiaxis 8a is preferably somewhat longer than the axial semiaxis 8b. A ratio of the radial semiaxis 8a to the axial semiaxis 8b of between 1 and 1.2 and, in particular, approximately 1.1335+/−5% is aimed at. The width 2c approximately corresponds to the rim width 117 when mounted. The largest width respectively the width 2a preferably corresponds to the largest width 112 of the rim 110, and preferably deviates a maximum of 25% and, in particular, a maximum of 10% from the width 112 of the rim 110. It is preferred for the widest point of the rim to be somewhat wider than the tire.

Figure 7:
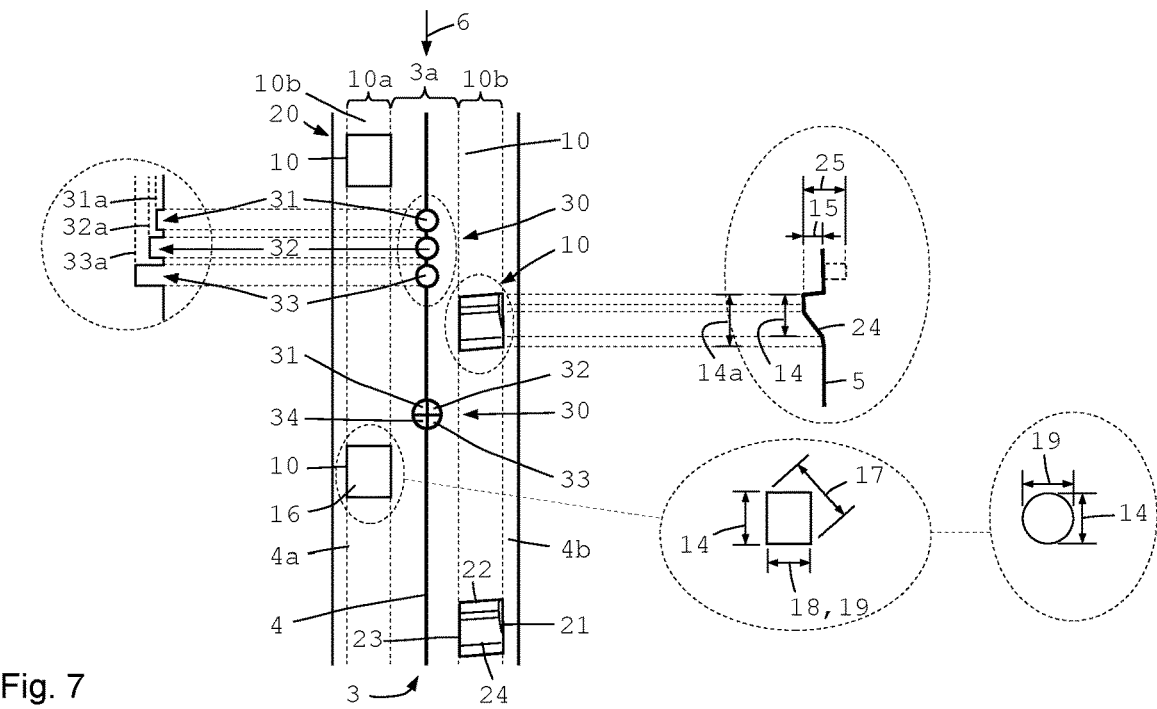
FIG. 7 a simplistic plan view of the tire according to FIG. 3.

FIG. 7 shows a schematic plan view of the surface 5 of the tire 2, wherein a few aero elements 10 and two different types of indicator units 30 are shown. The aero elements 10 delimit, and define, the angular bands 10a, 10b.

On the center of the tread surface 3 the two different types of indicator units 30 are illustrated just exemplarily. In the case of one indicator unit 30, it is configured as a depression, in which presently, four differently deep wear stages respectively indicator elements 31-34 are configured. Each of the wear stages is, in particular, recognizable as the pertaining indicator element 31-34 can no longer be identified respectively distinguished on the surface. It is also possible that as a wear stage is reached, differently colored material beneath the surface becomes visible. The indicator units 30 or single indicator elements 31-34 may be disposed in the longitudinal sectional plane 4 or laterally adjacent, inside the tread surface 3, e.g. optionally alternatingly to the right and left of the longitudinal sectional plane 4.

Alternately, it is also possible to provide indicator units with three spatially separate indicator elements 31, 32 and 33, each consisting of indicator elements of different depths. Again, wear is indicated in that abrasion of the tread surface makes a first indicator element 31 disappear. In this way, reading off a wear stage is particularly simple. Optionally, various indicator units may be disposed on the circumference of the tire 2 (and to the right/left spaced apart from the longitudinal sectional plane 4).

The indicator units 30 enable an advantageous assessment of the aerodynamic properties of the tire 2 according to the application. In a concrete trial model, it has been found that with increasing wear, the aerodynamic properties of the tire decrease. Measurements in a wind tunnel have shown that the averaged output required for overcoming the aerodynamic resistance of a rotating front wheel by means of the tire, increases approximately 9% with a used tire, after ca. 500 km. This is in comparison to a front wheel with a new tire 2. It has been determined with a testing speed (=wind speed) of 45 km/h. Or, in specific numbers in this example, 9.0 watt was weighted to 8.25 watt and measured averaged over all the angles (−20° to +20°). Therein, the radial semiaxis (tire radius) was reduced approximately 0.3 mm due to the wear on the raceway.

A preferred gradation for the tread wear elements of a multistage tread wear indicator is:
0.3 mm
0.6 mm
0.9 mm
1.2 mm Also conceivable are stages in steps of 0.4 mm or 0.5 mm or 0.6 mm. In one prototype, the thickness of the rubber layer on the raceway is maximally 2 mm. A tread wear indicator deeper than 2 mm is thus less useful in this case.

Also possible is a non-linear gradation at 5%, 15%, 30% and 50% of the profile thickness, and additionally as a "normal" tread wear indicator at 75% or 90%.

Figure 10:
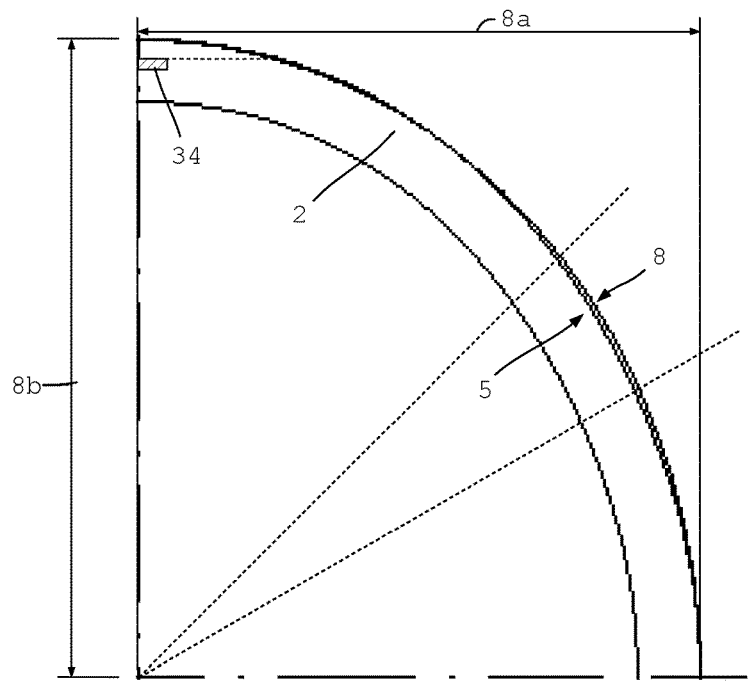
FIG. 10 the cross sectional contour of an adapted ellipse and of the tire.

With increasing wear, the thickness of the raceway decreases in operation, so that the radial semiaxis $8a$ decreases, while the axial semiaxis $8b$ remains constant (see also FIG. 10). In a specific example, given a wear of 0.3 mm, the radial semiaxis $8a$ decreases from 15.415 mm to 15.115 mm, while the axial semiaxis $8b$ remains at 13.6 mm. Then, the original ratio of the radial semiaxis $8a$ to the axial semiaxis $8b$ in the new condition (at an air pressure of 8 bar) of 15.415/13.6=1.1335 has reduced, in the example measured, after 500 km traveling, to 15.155/13.6=1.1114. The shape of the (slightly) worn tire can basically still be called oval or elliptic, although continuous straight-ahead travel flattens the outwardly, circumferential area. Strictly speaking, the shape is then like a radially outwardly oblated or flattened ellipse.

Additionally, FIG. 7 shows a total of four aero elements 10 on the two sides $4a$ and $4b$ of the longitudinal sectional plane 4.

While on the side $4a$ the indicator elements 10 are schematically illustrated as rectangles, the aero elements 10 on the side $4b$ show a more complex structure. The different shapes are illustrated just exemplarily. Preferably, all the aero elements 10 of a tire 2 are designed the same, having a shape like the aero elements 10 on the side $4b$. Preferably, most or nearly all, or all of the (different) aero elements 10 are distributed symmetrically on both sides of the longitudinal sectional plane.

It is e.g. possible for one half (or one third, or a fixed number or the like) of the aero elements 10 to show a first shape, and the other half (or a fixed number or the like) of the aero elements 10, a different shape. For example, one half of the aero elements 10 may be rectangular, and the other half, oval or round or rounded. For example, one third may be rectangular, one third, round, and one third, oval in configuration. Even then, single aero elements 10 may be provided with another shape. Then, the differently shaped aero elements 10 are preferably distributed alternatingly in line over the circumference. The aero elements 10 are, in particular, configured similarly or identical on both sides $4a$, $4b$.

Preferably, nearly all or all of the aero elements 10 are configured as compact structures 20, and being simple pot- or basin-shaped depressions 11, they may be equipped with uniform outwardly surfaces 16.

Alternately it is possible for the aero elements 10 to be at least partially configured as more complex depressions, comprising for example three steep (or steeper) side walls 21, 22 and 23, while the fourth side wall 24 is configured with a flatter inclination. In proper operation the flatter inclination is, in particular, oriented forwardly in the traveling direction at the top end of the tire. The top end of the tire is farthest removed from the ground, and the flatter inclination is oriented forwardly, while the rear end shows a steep rise. This achieves advantageous aerodynamic properties and optimal turbulence, without unnecessary energy input for creating air turbulence. The impinging air is softly introduced into the depression of the aero element 10, and impinges on the steep wall at the end of the aero element 10.

The aero elements 10 are located on both sides of the tread surface 3, each inwardly of the angular band $10a$, $10b$, whose extension in the axial direction ensues from the maximum extension of the aero elements 10 in the axial direction. This means that the angular bands $10a$, $10b$ each enclose all of the aero elements 10 of one side by concentric circles as closely as possible. The two concentric circles on each of the two sides are shown in broken lines, presently as perpendicular lines, in parallel to the longitudinal sectional plane 4.

The proportion of the surface of the aero elements 10 to the entire peripheral surface of the angular band $10a$, $10b$, is less than 25% of the surface of the angular band $10a$ and preferably more than 5%, in this case it lies specifically in the range of 17.5%+/−5%. This comparatively low proportion of the aero elements to the peripheral surface of the angular band, avoids unnecessarily high turbulence in the impinging air, while on the other hand, sufficient turbulence is provided even in slow relative speeds of the ambient air and the wheel component respectively the tire.

The proportion of all the surfaces 16 of all the aero elements 10 combined, is preferably less than 10% of the surface visible in proper use of the tire 2, and preferably less than 10% of the entire outwardly surface of the tire 2. The proportion of the surfaces 16 of all the aero elements 10 together is presently approximately 4% of the outwardly surface, the tire beads excluded.

Additionally, FIG. 7 schematically shows on the left side a conceivable depth curve of the indicator elements 31-33, each showing the respective wear stages $31a$, $32a$ and $33a$. As the depth $31a$ is reached, it is indicated that in terms of aerodynamics, the tire 2 is no longer recommended for use on the front wheel, at least not in bicycle races or the like. Reaching the depth $32a$ indicates that in terms of aerodynamics, the tire 2 is no longer recommended for use on the rear wheel. In terms of aerodynamics, the wear on the rear wheel is less critical, because the front wheel and the frame are located in front over large areas. Reaching the depth $33a$ indicates that the tire 2 is no longer recommended, also for reasons of security. Alternately it is possible to provide further stages, enabling finer gradation.

The right side of FIG. 7 schematically illustrates other, likewise compact structures 20 of aero elements 10. On the whole, the ratio of the maximum extension 17 of an aero element 10 to a minimum extension 18 preferably lies in the region between 1 and 5, and in particular in the region between 1 and 2, and preferably between 1.25 and 1.75. The ratio of the length 19 in the transverse direction to the length 14 in the peripheral direction, in the case of rectangular or approximately rectangular aero elements, is preferably more than 1 and less than 2.

In FIG. 7 (and in all the other exemplary embodiments and configurations) all the aero elements 10 may be configured as depressions with a (nearly) planar ground respectively bottom, wherein some, or all, of the sidewalls are configured steep and show an angle of 75° or more to the peripheral surface.

Additionally, inserted in FIG. 7 are approximately basin-shaped aero elements 10, which are particularly preferred. They preferably show three steeper side walls 21-23 and one side wall 24 showing a flatter inclination. The maximum radial extension 15 is preferably larger than 0.5 mm and, in particular, smaller than 1.5 mm. The maximum depth of the depression 11 is presently about 0.75 mm. It is also possible to provide, instead of depressions 11, elevations 12 as aero elements 10. It is also possible to configure both depressions 11 and elevations 12 (shown in broken lines), so that the maximum height difference 25 is accordingly larger.

Figure 8:
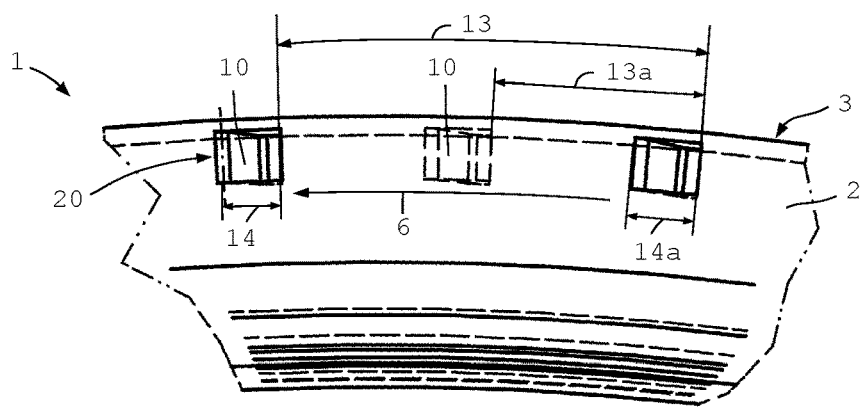
FIG. 8 an enlarged detail of a side view of the tire according to FIG. 3.

FIG. 8 shows an enlarged detail of a side view of the wheel component 1, wherein two aero elements 10 can be seen on the facing side of the tire 2, while one aero element 10 is inserted in-between on the averted side, shown in broken lines. In the peripheral direction, there is a distance 13 between the aero elements 10 on one side, respectively half the distance 13a between an aero element on one side, and the next aero element on the other side. The exemplary embodiment is provided on each side with 48 (approximately 50) elements 10, so that an angular distance 13 of 7.5° respectively an angular distance 13a at an angle of 3.75° ensues.

The length 14 in the peripheral direction is presently a total of 7 mm including the inclined side wall 24. Transverse thereto, the aero element extends over the surface, presently in the radial direction, over a length 19 of presently 8 mm. In operation, the tire shows a width 2a of 27.2 mm. The long semiaxis 8a is approximately 15.4 mm and the short, axial semiaxis is approximately 13.6 mm.

Figure 9A:
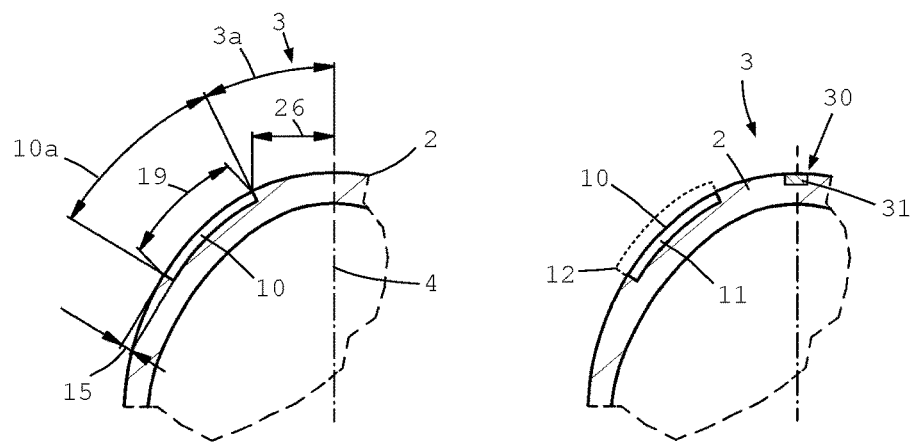
FIG. 9a an enlarged detail of the side view of the tire according to FIG. 3 with and without dimensions.

FIG. 9a shows on the left a detail of the cross section of the tire 2, wherein various dimensions are inserted, and to the right thereof, basically the same detail is shown, absent dimensions, to enhance viewing. The distance 26 in the axial direction between the beginning of an aero element 10 and the central longitudinal sectional plane in a concrete example is approximately 5.3 mm and in another concrete example, approximately 3 mm to 4 mm. The depth 15 of these aero elements is 0.75 mm each.

Additionally, the image on the right of FIG. 9a shows in broken lines an aero element 10, which is configured as an elevation 12. Moreover, FIG. 9a also shows on the right, an indicator unit with an indicator element 31. Abrasions cause the indicator element 31 to disappear, thus a corresponding wear stage is reached.

Figure 9B:
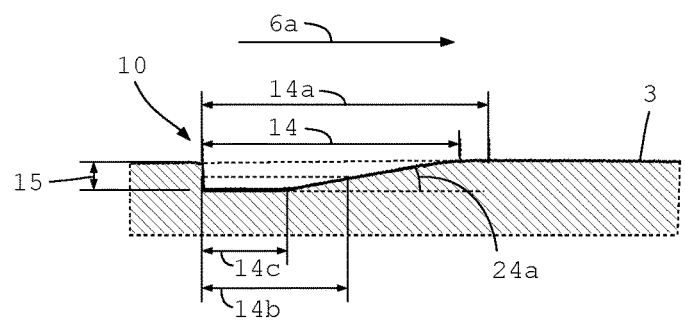
FIG. 9b a section of an aero element of the tire according to FIG. 3 in the peripheral direction.

FIG. 9b shows a cross sectional curve in the peripheral direction of the wheel component 1. The depression of the aero element 10 extends in the peripheral direction of the wheel component 1 over a total length 14a of 7 mm, wherein the depression, at the end on the right, is firstly slightly rounded to then make a transition to an inclination 24a of the side 24 of approximately 9°. An effective or actual length 14 of 6 mm ensues. The depression 11 extends over a length 14b in the peripheral direction at a depth that is larger than half the maximum depth 15. The length 14b is preferably larger than 50% of the length 14 or, in particular, also the total length 14a. The length 14b is preferably at least 2.5 mm and, in particular 3 mm or more. The aero element reaches a maximum depth over a length 14c which is approximately 1/3 or more of the length 14, in particular, between 20% and 40% of the length 14.

FIG. 10 shows a radially outwardly quadrant of the cross section of the tire, wherein, besides the tire profile, the curve of an ideal ellipse 8 with the semiaxes 8a and 8b is inserted. It can be clearly seen that in the area of the angles shown in broken lines, of 45° and 60° to the central longitudinal sectional plane 4, the outwardly surface of the tire 2 runs radially inwardly of the elliptic curve 8. The radial difference is small, and is preferably less than 1 mm for each of the angles. FIG. 10 furthermore shows an embedded indicator unit 30 with an indicator element, which is formed by an indicator material 34. As the central tread surface 3a wears down, the wall thickness turns thinner, primarily in the area of the longitudinal sectional plane, and the middle area of the tire flattens. Finally, the material of the tire 2 is worn down far enough so that the embedded indicator material 34 becomes visible. In this way it is clearly shown that a specific wear stage is reached. Different wear stages may be indicated by differently colored indicator materials 34.

Figure 11A:
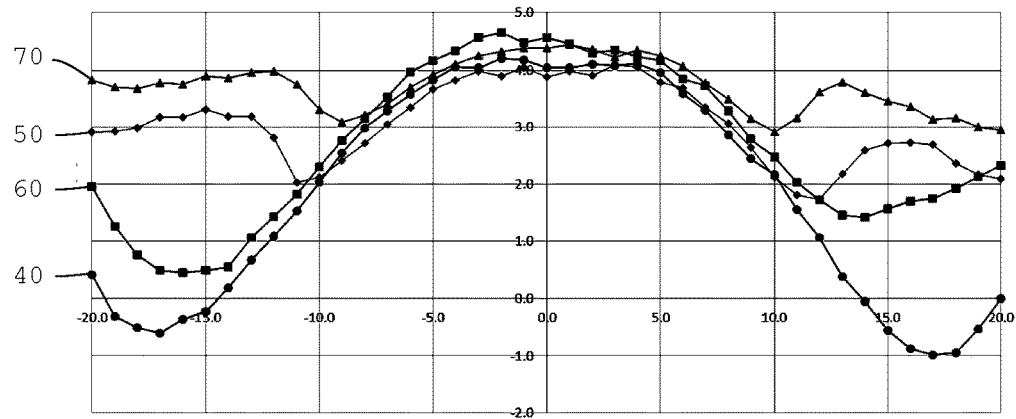
FIGS. 11a-11c measurements of different wheel components in a wind tunnel at different speeds.
Figure 11B:
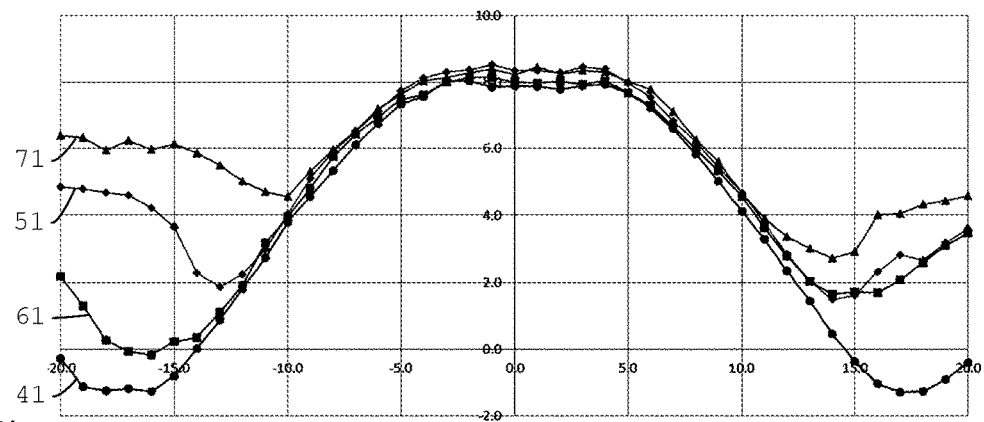
Figure 11C:
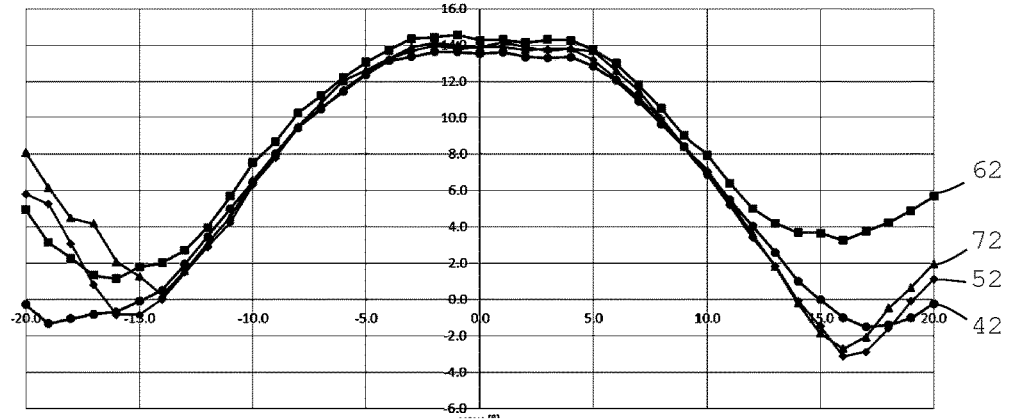

The FIGS. 11a to 11c show measurement results from the wind tunnel with the wheel component 1 according to the invention and a number of different competitors' products, for all of which the same rim was used.

The curve traces 40, 41 and 42 in the FIGS. 11a to 11c show the measuring curves for the pertaining wheel component 1 according to the invention.

FIG. 11a illustrates the required aerodynamic power in watt over the impingement angle in degrees for the different wheel components. It can be clearly seen that the wheel component 1 according to the invention generates a distinct sailing effect at a speed of 30 km/h already at angles of 15° to 20°, and produces excellent results also in head-on impingement. The curves 50, 60 and 70 of the competitors' products all show, at the same tire widths, no sailing effect, and thus no assistance and propulsion with slightly inclined impingement angles. For better comparison of values measured in a wind tunnel, the values have preferably been converted to a defined reference density.

As FIG. 11b shows, the wheel component 1 according to the invention retains its advantages even in traveling speeds or relative speeds of 37.5 km/h. Again, the aerodynamic performance is plotted over the impingement angle in various competing products. The curve 41 shows the course of the wheel component 1 according to the invention. It can be seen that at a speed of 37.5 km/h the wheel component 1 according to the invention shows a very advantageous sailing effect and thus a positive assistance, while excellent wind tunnel results also show in the central range of the impingement. None of the competing products concretely shows a sailing effect.

At relative speeds of 30 km/h and 37.5 km/h, the best results are obtained with the wheel component 1 according to the invention. This virtually applies to all the angular ranges. The obtainable sailing effect provides propulsion, assisting the rider.

FIG. 11c likewise shows excellent results for the wheel component 1 according to the invention (curve 42), now at the higher relative speed of 45 km/h. Only in this comparatively high relative speed do some competing products achieve sailing effects. Again, the invention provides the very best results over broad ranges.

Another considerable advantage of the present invention is that the sailing effect does not only show in high speeds, but already in considerably lower speeds.

Figure 12A:
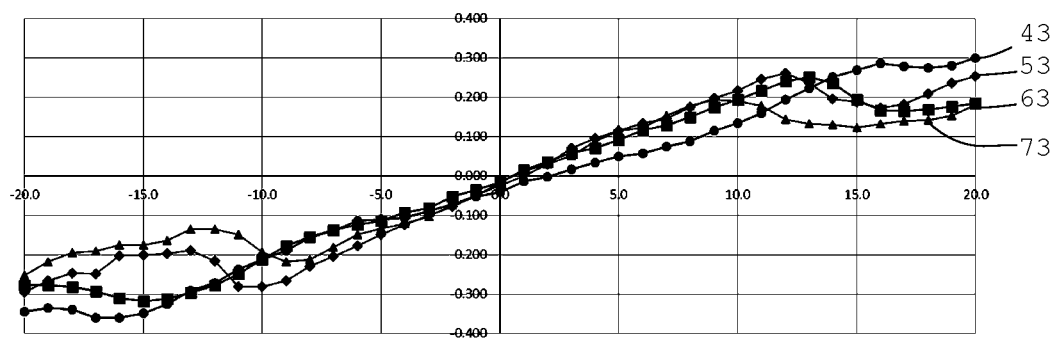
FIGS. 12a and 12b steering torques at two different speeds using different wheel components.
Figure 12B:
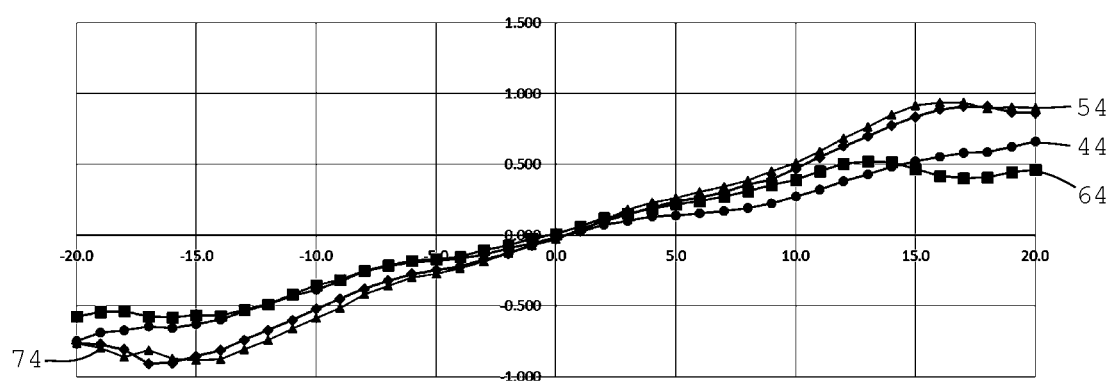

The measured curves in the FIGS. 12a and 12b show the required steering torque over the impingement angle at 30 km/h (FIG. 12a) and at 45 km/h (FIG. 12b). In particular, at the higher speeds in FIG. 12b it can clearly be seen that no negative effects on the steering torque occur. Note the different scale in the Y direction in FIGS. 12a and 12b.

On the whole, the present invention shows that marked improvements in terms of aerodynamics are obtained. Distinct sailing effects can be obtained not only in high speeds, but already in comparatively low speeds of 30 km/h. Since the tire whirls the impinging air in a controlled way, neither too strong nor too weak, the positive effect can be achieved using different rims.

The curves 40, 41, 42, 43 and 44 pertain to the wheel component 1 according to the invention. The curves 50, 51, 52, 53 and 54 pertain to a first competing product, the curves 60, 61, 62, 63 and 64, to a second competing product, the curves 70, 71, 72, 73 and 74, to a third competing product.

On the whole, the invention provides an advantageous tire and an advantageous wheel component.

While a particular embodiment of the present wheel component in particular for bicycles, have been described herein, it will be appreciated by those skilled in the art that changes and modifications may be made thereto without departing from the invention in its broader aspects and as set forth in the following claims.

| List of reference numerals: | |
|---|---|
| 1 | wheel component |
| 2 | tire |
| 2a | width |
| 2b | tire bead |
| 2c | width |
| 2d | reinforcement ring |
| 2e | tubular tire |
| 3 | tread surface |
| 3a | triangle segment |
| 4 | longitudinal sectional plane |
| 4a, 4b | side |
| 5 | surface of 2 |
| 6 | peripheral direction |
| 6a | direction of rotation |
| 6b | forward traveling direction |
| 7 | type code |
| 8 | elliptical shape |
| 8a | radial semiaxis |
| 8b | axial semiaxis |
| 9a, 9b | side surface |
| 10 | aero element |
| 10a, b | angular band |
| 11 | depression |
| 12 | elevation |
| 13 | distance in the peripheral direction |
| 13a | offset |
| 14 | length in the peripheral direction |
| 14a | total length |
| 14b | length |
| 14c | length |
| 15 | radial extension, depth, height |
| 16 | outwardly surface of 10 |
| 17 | maximum extension |
| 18 | minimum extension |
| 19 | length in the transverse direction |
| 20 | structure |
| 21-23 | side wall |
| 24 | inclined side wall |
| 24a | angle |
| 25 | maximum height difference |
| 26 | axial distance |
| 30 | indicator unit |
| 31 | indicator element |
| 31a | wear stage |
| 32 | indicator element |
| 32a | wear stage |
| 33 | indicator element |
| 33a | wear stage |
| 34 | indicator material |
| 40-44 | measured curve |
| 50-54 | measured curve |
| 62-64 | measured curve |
| 70-74 | measured curve |
| 80 | measured curve |
| 100 | bicycle |
| 101 | wheel, front wheel |
| 102 | wheel, rear wheel |
| 103 | frame |
| 104 | fork |
| 105 | pedal crank unit |
| 106 | handlebar |
| 107 | saddle |
| 108 | hub |
| 109 | spoke |
| 110 | rim |
| 111 | rim flank |
| 112 | maximum width of 110 |
| 113 | rim base |

| List of reference numerals: | |
|---|---|
| 114 | surface |
| 115 | rim flange |
| 116 | rim well |
| 117 | rim width |
| 118 | rim height |
| 119 | height |
| 120 | plane ground |

The invention claimed is:

1. A wheel component for at least partially muscle-powered sports and racing bicycles, comprising:
an annular tire and a tread surface configured in a central triangle segment and laterally adjacent side surfaces;
wherein the tread surface in proper use in straight-ahead travel on a plane ground makes at least partial contact with the surface of the ground, opening up a longitudinal sectional plane;
wherein aero elements are configured on the surface of the annular tire;
the aero elements are each configured planar as a depression in the surface of the tire and are disposed on the side surfaces; and define circumferential angular bands on the side surfaces;
wherein each circumferential angular band is defined radially inwardly and radially outwardly by the radial extension of the aero elements;
and that the surface proportion of the aero elements to the surface of an angular band is more than 5% and less than 25%,
and wherein each aero element is configured separately on the surface and wherein a distance from each said aero element to the next said aero element is larger than the maximum dimension of the aero element;
wherein the surface of the circumferential angular band is configured without profile, except for said aero elements;
wherein the surface proportion of the aero elements to the surface of the tire that is visible in proper use, is on the whole more than 2% and less than 8%, and wherein each aero element comprises between 0.01% and 0.1% of the surface of the tire visible in proper use.

2. The wheel component according to claim 1, wherein the aero elements each show an angular structure, and wherein at least two side wall sections of the aero element are configured in the radial direction defining an angle larger than 60° relative to the circumferential annular band.

3. The wheel component according to claim 1, wherein a maximum height difference of each said aero element relative to the tread surface is at least twice a maximum height difference of a remainder of the angular band excluding the aero elements relative to the tread surface, and wherein the tread surface and the surface of each of the angular bands is configured without profile, except for the aero elements.

4. The wheel component according to claim 1, wherein, except for the aero elements, the surface of the tire in proper use is configured without profile.

5. The wheel component according to claim 1, wherein, except for the aero elements, the surface of the tire in proper use is configured smooth.

6. The wheel component according to claim 1, wherein a total of more than 20 and less than 200 aero elements are configured on the surface of the annular tire.

7. The wheel component according claim 6, wherein aero elements are configured on both sides of the longitudinal sectional plane, and wherein on the two sides of the longitudinal sectional plane, at least two axially adjacent aero elements are disposed offset to one another in the peripheral direction.

8. The wheel component according to claim 1, wherein at least one aero element shows a radial extension between 0.40 mm and 2 mm,
and wherein at least one aero element shows, on the surface transverse to the circumference of the tread surface, a length between 3 mm and 15 mm, and a length on the surface in the peripheral direction, between 3 mm and 15 mm.

9. The wheel component according to claim 8, wherein the aero element shows a radial extension between 0.5 mm and 1.5 mm.

10. The wheel component according to claim 1, wherein at least one aero element shows a pouch-, pot- or basin-like structure, and wherein at least one aero element shows a radially outwardly surface on the tire between 15 square millimeters and 100 square millimeters.

11. The wheel component according to claim 1, wherein a ratio of a maximum extension to a minimum extension of the aero elements on the surface of the tire is less than 3.

12. The wheel component according to claim 11, wherein a ratio of the maximum length in the peripheral direction of the tread surface to the maximum length in the transverse direction of the aero elements is between 1/3 and 3.

13. The wheel component according to claim 10, wherein at least one aero element shows an angular structure, wherein at least two side walls extending in the radial direction show an angle to the surface of more than 75°, and comprises at least one inclined side wall extending in the peripheral direction, which substantially shows an angle of less than 45° to the surface.

14. The wheel component according to claim 1, wherein at least one type code is comprised, which is formed by way of local elevations, and projects 3.2 mm outwardly beyond the surrounding surface.

15. The wheel component according to claim 1, wherein a central tread surface extends over a triangle segment of more than 20° and less than 70° transverse to the peripheral direction of the tread surface, and wherein the aero elements extend on each side in an angular band of less than 45° width.

16. The wheel component according to claim 15, wherein the tire is substantially configured oval and has a radial semiaxis that is larger than the axial semiaxis, wherein the ratio of the radial semiaxis to the axial semiaxis is between 1 and 1.25.

17. The wheel component according to claim 1, wherein at least one indicator unit is configured on the circumference of the tread surface to indicate an aerodynamic quality degree of the tire, and wherein the indicator unit is suitable and configured to indicate different wear stages,
and wherein as a predetermined wear stage is reached, the aerodynamic properties have dropped beneath a predetermined degree when used on a front wheel, and
wherein as a further, predetermined stage is reached, the aerodynamic properties have dropped beneath a predetermined degree when used on a rear wheel.

18. The wheel component according to claim 1, comprising a rim with a substantially smooth surface without whirling elements, on which the tire can be mounted, and wherein the rim shows a maximum width of more than 2/3 and less than 4/3 of the maximum width of the tire.

19. A wheel component for at least partially muscle-powered sports and racing bicycles, comprising:
an annular tire and a tread surface configured in a central triangle segment and laterally adjacent side surfaces; wherein the tread surface in proper use in straight-ahead travel on a plane ground makes at least partial contact with the surface of the ground, opening up a longitudinal sectional plane;
wherein aero elements are configured on the surface of the annular tire;
the aero elements are each configured planar as a depression in the surface of the tire and are disposed on the side surfaces, and define circumferential angular bands on the side surfaces;
wherein an angular band is configured as a ring, which is defined radially inwardly and radially outwardly by the radial extension of the aero elements,
the surface proportion of the aero elements to the surface of an angular band is more than 5% and less than 25%,
the surface of the tire in proper use is configured without profile, except for the aero elements,
at least one aero element shows a radial extension between 0.40 mm and 2 mm,
and a ratio of the maximum extension to the minimum extension of the aero elements on the surface of the tire is less than 5.

20. The wheel component according to claim 19, where the ratio of the maximum extension to the minimum extension of the aero elements on the surface of the tire is less than 3.

21. A wheel component for at least partially muscle-powered sports and racing bicycles, comprising:
an annular tire and a tread surface configured in a central triangle segment and laterally adjacent side surfaces;
wherein the tread surface in proper use in straight-ahead travel on a plane ground makes at least partial contact with the surface of the ground, opening up a longitudinal sectional plane;
wherein aero elements are configured on the surface of the annular tire;
the aero elements are each configured planar as a depression in the surface of the tire and are disposed on the side surfaces; and define circumferential angular bands on the side surfaces;
wherein each circumferential angular band is defined radially inwardly and radially outwardly by the radial extension of the aero elements;
and that the surface proportion of the aero elements to the surface of an angular band is more than 5% and less than 25%,
and wherein each aero element is configured separately on the surface and wherein a distance from each said aero element to the next said aero element is larger than the maximum dimension of the aero element;
wherein the surface of the circumferential angular band is configured without profile, except for said aero elements; and
wherein a ratio of a maximum extension to a minimum extension of the aero elements on the surface of the tire is less than 3.

* * * * *